United States Patent
Jain et al.

(10) Patent No.: US 8,639,885 B2
(45) Date of Patent: Jan. 28, 2014

(54) REDUCING IMPLEMENTATION COSTS OF COMMUNICATING CACHE INVALIDATION INFORMATION IN A MULTICORE PROCESSOR

(75) Inventors: Prashant Jain, San Jose, CA (US); Sandip Das, Belmont, CA (US); Sanjay Patel, San Ramon, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1071 days.

(21) Appl. No.: 12/643,238

(22) Filed: Dec. 21, 2009

(65) Prior Publication Data

US 2011/0153942 A1   Jun. 23, 2011

(51) Int. Cl.
*G06F 12/00* (2006.01)

(52) U.S. Cl.
USPC ............ 711/133; 711/E12.024; 711/E12.037; 711/122; 711/128

(58) Field of Classification Search
USPC ........................................................ 711/133
See application file for complete search history.

(56) References Cited

U.S. PATENT DOCUMENTS

| | | | |
|---|---|---|---|
| 3,845,474 A | 10/1974 | Lange et al. | |
| 5,768,598 A | 6/1998 | Marisetty et al. | |
| 5,895,487 A | 4/1999 | Boyd et al. | |
| 6,026,461 A | 2/2000 | Baxter et al. | |
| 6,499,123 B1 | 12/2002 | Mcfarland et al. | |
| 6,704,822 B1 | 3/2004 | Tremblay et al. | |
| 7,366,879 B2 | 4/2008 | Rodgers et al. | |
| 7,711,830 B2 | 5/2010 | Bird et al. | |
| 8,145,848 B2 | 3/2012 | Jain et al. | |
| 2002/0178329 A1* | 11/2002 | Chaudhry et al. | 711/122 |
| 2004/0059871 A1* | 3/2004 | Arimilli et al. | 711/122 |
| 2007/0220233 A1 | 9/2007 | Mozak | |
| 2008/0040640 A1 | 2/2008 | Okabayashi | |
| 2008/0256278 A1 | 10/2008 | Thomas et al. | |
| 2012/0239883 A1 | 9/2012 | Jain et al. | |

FOREIGN PATENT DOCUMENTS

WO   9713204 A1   4/1997

* cited by examiner

*Primary Examiner* — Reginald Bragdon
*Assistant Examiner* — Hamdy S Ahmed
(74) *Attorney, Agent, or Firm* — Meyertons Hood Kivlin Kowert & Goetzel; Stephen J. Curran

(57) ABSTRACT

A processor may include several processor cores, each including a respective higher-level cache, wherein each higher-level cache includes higher-level cache lines; and a lower-level cache including lower-level cache lines, where each of the lower-level cache lines may be configured to store data that corresponds to multiple higher-level cache lines. In response to invalidating a given lower-level cache line, the lower-level cache may be configured to convey a sequence including several invalidation packets to the processor cores via an interface, where each member of the sequence of invalidation packets corresponds to a respective higher-level cache line to be invalidated, and where the interface is narrower than an interface capable of concurrently conveying all invalidation information corresponding to the given lower-level cache line. Each invalidation packet may include invalidation information indicative of a location of the respective higher-level cache line within different ones of the processor cores.

20 Claims, 8 Drawing Sheets

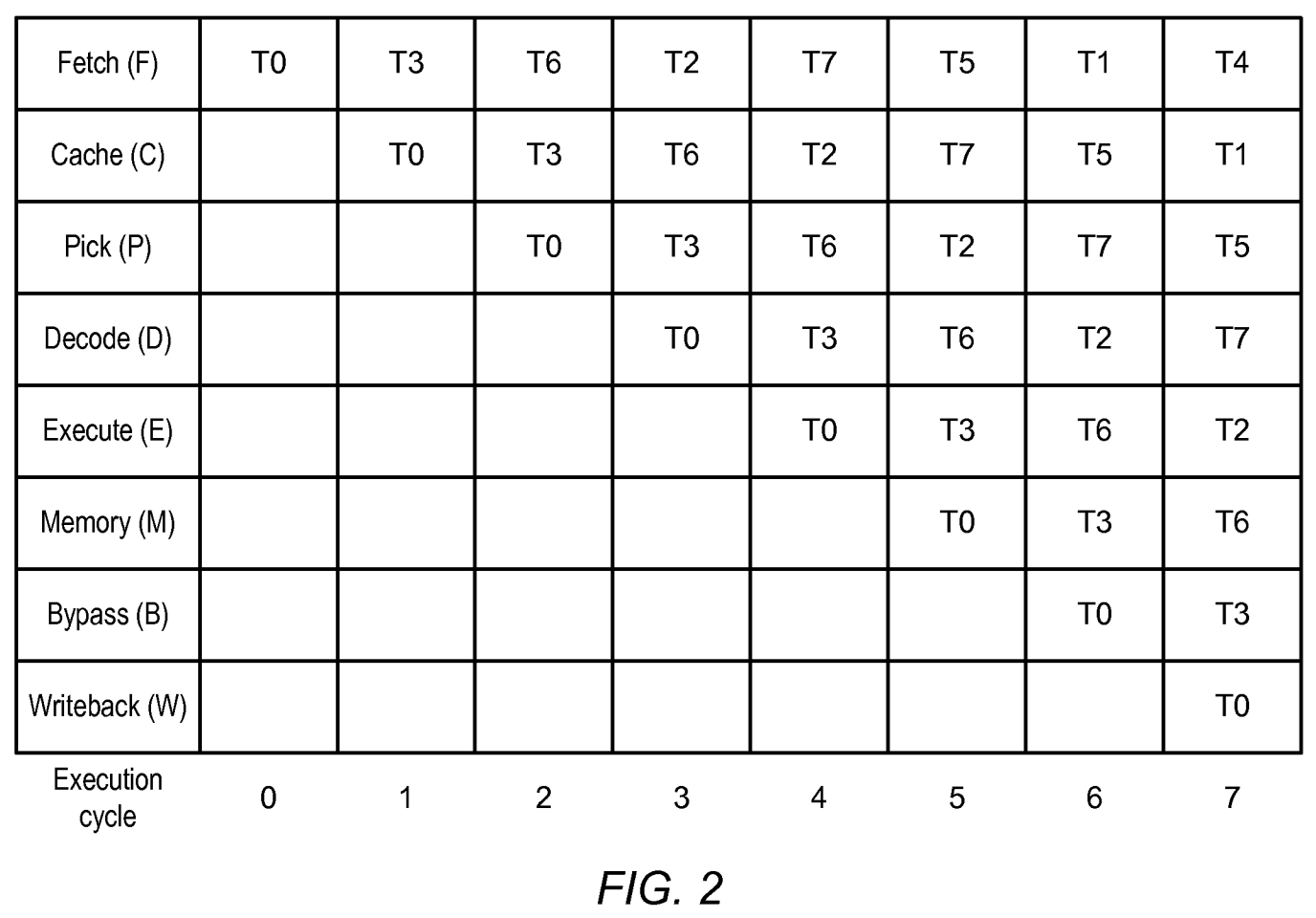

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |

Execution cycle

*FIG. 2*

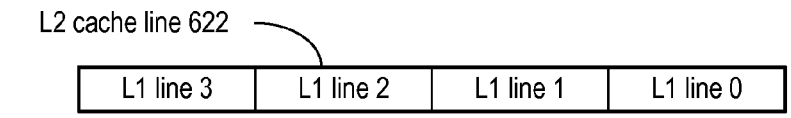
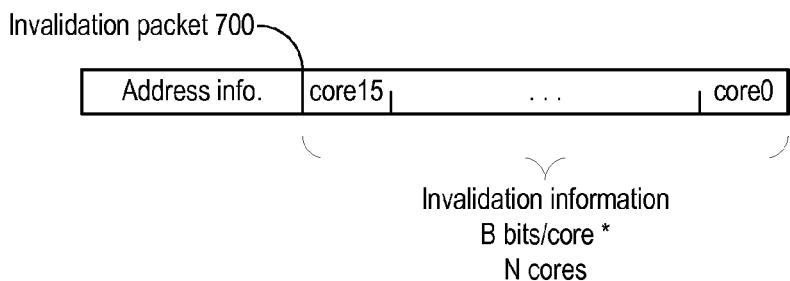
FIG. 7
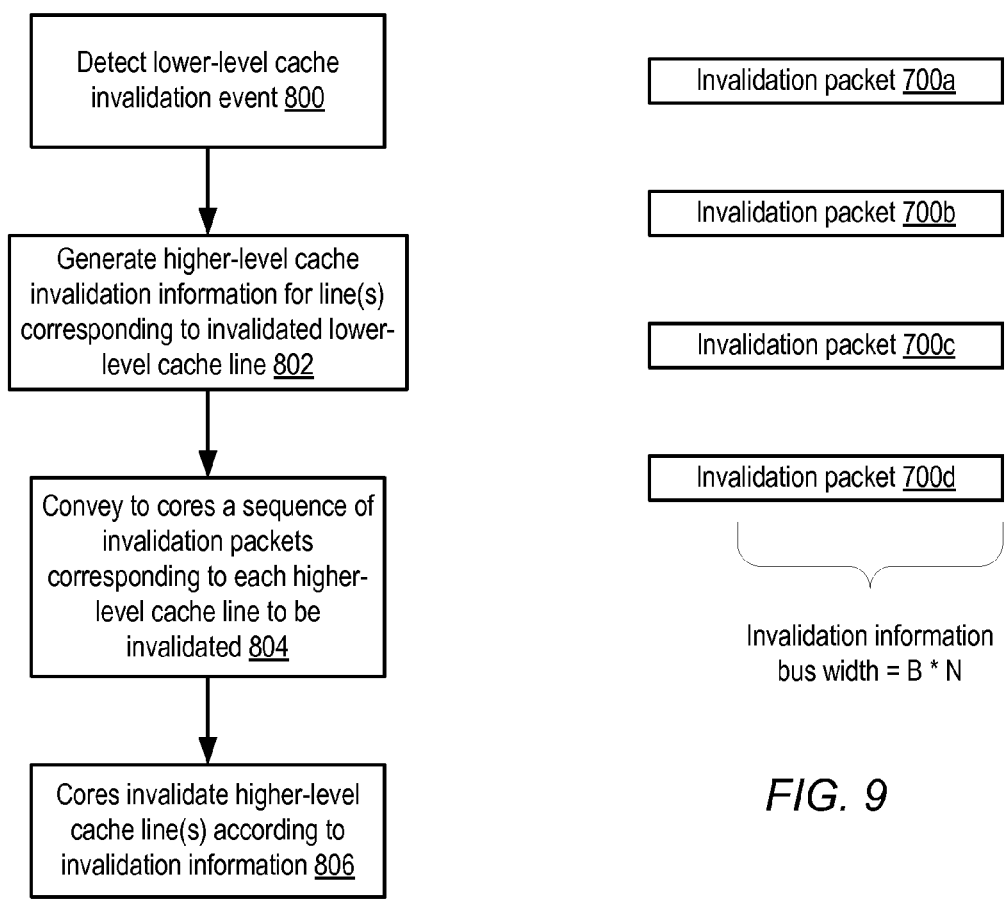
FIG. 8
FIG. 9

Format:  xx00   No invalidation needed
         ww10   Invalidate way ww of Dcache
         www1   Invalidate way www of Icache ure (ISA). In one embodiment, core 100 may be configured

REDUCING IMPLEMENTATION COSTS OF COMMUNICATING CACHE INVALIDATION INFORMATION IN A MULTICORE PROCESSOR

BACKGROUND

1. Field of the Invention

This invention relates to processors and, more particularly, to implementation of cache memory systems.

2. Description of the Related Art

To improve execution performance, processors commonly include multiple levels of caches. For example, a processor may include a fast first-level (L1) cache backed by a larger, slower second-level (L2) cache. Such an arrangement may reduce average memory access latency relative to an implementation in which the L2 cache is omitted, in that an L1 cache miss that hits in the L2 cache need not incur the full latency of an access to system memory.

The integration of multiple processor cores into a single processor has resulted in configurations in which several independent L1 caches within the cores may share a common L2 cache. Depending on the configuration of the caches, certain memory activity that occurs with respect to the L2 cache may necessitate invalidation of data in each of the L1 caches. For example, if an L2 cache line is invalidated, it may be necessary to invalidate any lines resident in the L1 caches that correspond to the invalidated L2 cache line.

However, the state of the data to be invalidated may differ among the various L1 caches. For example, the data may not exist in some L1 caches, while in others, it may reside in different locations of the cache (e.g., in different cache ways). Correspondingly, it may be necessary to determine and communicate invalidation information separately for each processor core. As the number of cores increases, however, the complexity of routing an increased amount of invalidation information between the lower-level cache and the cores may increase processor implementation costs, in terms of factors such as die area and power consumption.

SUMMARY

Various embodiments of techniques for reducing the implementation costs of communicating cache invalidation information in a multicore processor are disclosed. In some embodiments, a processor may include several processor cores, each including a respective higher-level cache, where each higher-level cache includes higher-level cache lines. The processor may also include a lower-level cache including lower-level cache lines, where each of the lower-level cache lines may be configured to store data that corresponds to multiple higher-level cache lines. In response to invalidating a given lower-level cache line, the lower-level cache may be configured to convey a sequence including several invalidation packets to the processor cores via an interface, where each member of the sequence of invalidation packets corresponds to a respective higher-level cache line to be invalidated, and where the interface is narrower than an interface capable of concurrently conveying all invalidation information corresponding to the given lower-level cache line. Each invalidation packet may include invalidation information indicative of a location of the respective higher-level cache line within different ones of the processor cores.

BRIEF DESCRIPTION OF THE DRAWINGS

FIG. 2 is a pipeline diagram illustrating an embodiment of instruction execution in a fine-grained multithreaded processor core.

FIG. 7 is a block diagram illustrating an embodiment of an L2 cache line and an embodiment of an invalidation packet.

FIG. 8 is a flow diagram illustrating the operation of an embodiment of a processor using an invalidation packet that is adapted for invalidation of individual higher-level cache lines in response to the invalidation of a lower-level cache line.

FIG. 9 illustrates an example sequence of invalidation packets.

Figure 1:
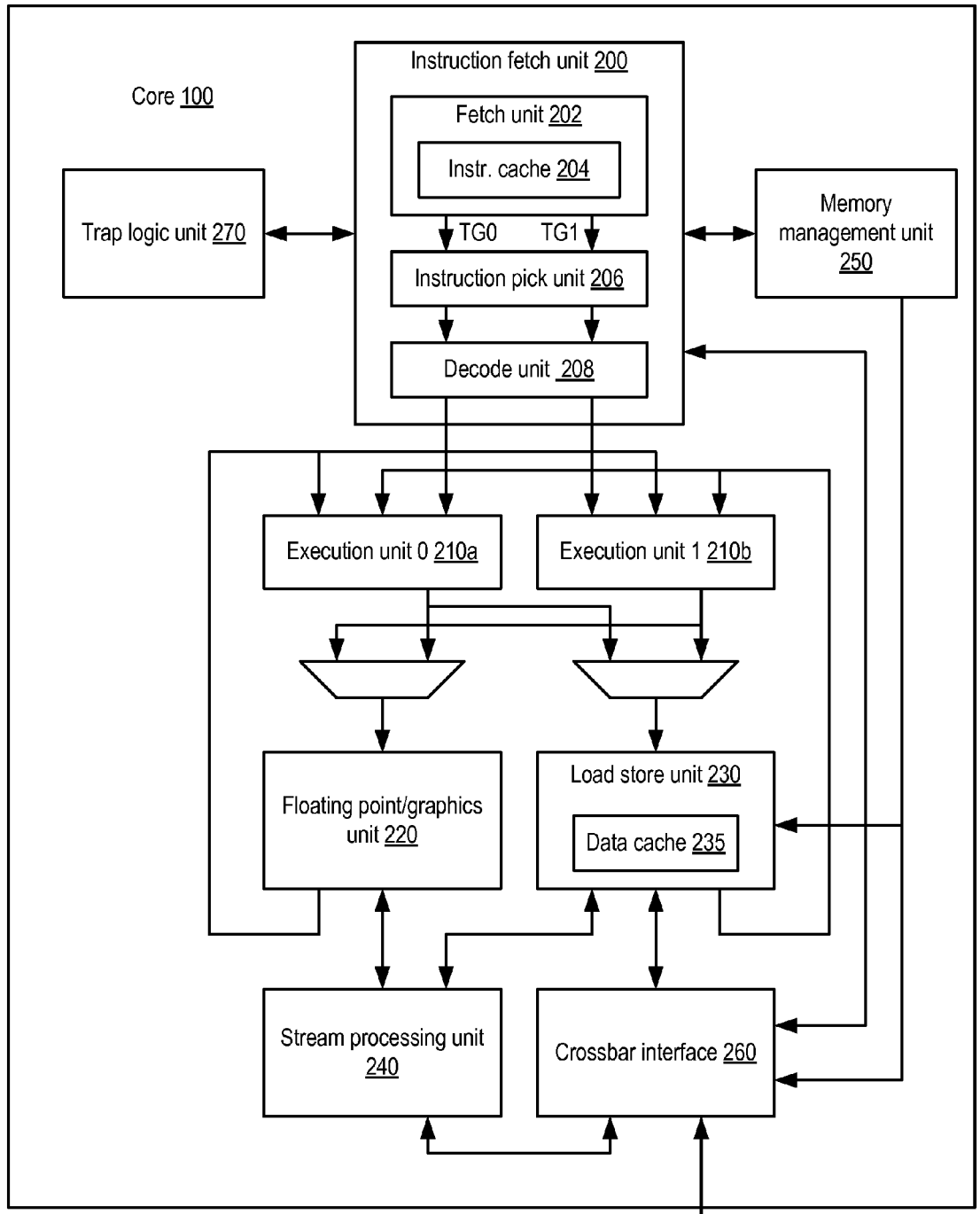
FIG. 1 is a block diagram illustrating an embodiment of a processor core configured to perform fine-grained multithreading.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In the following discussion, embodiments of multithreaded processors that implement multiple processor cores will be considered. First, an overview of an example processor core is described, along with an example pipeline diagram illustrating possible instruction flow through a multithreaded processor core. Embodiments of processors including different numbers of cores as well as other features are then discussed. Techniques for mitigating the implementation costs of cache invalidation information within a multicore processor are then described. Finally, an example system that might include a multithreaded, multicore processor is discussed.

Overview of Fine-Grained Multithreading Processor Core

Generally speaking, a processor core (or simply, a "core") may refer to a unit of a processor that is capable of executing instructions and processing data independently of other processor cores within the processor, such that multiple cores may execute instructions concurrently. One example of a processor core is shown in FIG. 1 as core 100.

Core 100 may be configured to execute instructions and to process data according to a particular instruction set architecture (ISA). In one embodiment, core 100 may be configured to implement the SPARC® V9 ISA, although in other embodiments it is contemplated that any desired ISA may be employed, such as x86, PowerPC® or MIPS®, for example. Additionally, as described in greater detail below, in some embodiments each instance of core 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, core 100 may be configured to concurrently execute instructions from eight threads. Thus, a processor including four, eight, or sixteen instances of core 100 may be configured to concurrently process 32, 64, or 128 threads, respectively. However, in other embodiments it is contemplated that any suitable number of cores 100 may be included within a processor, and that cores 100 may concurrently process some other number of threads.

In some embodiments, such as the one illustrated in FIG. 1, core 100 may be configured to perform fine-grained multithreading. In this type of multithreading, each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Example Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 2. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 2.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Processor Configurations Including Multiple Multithreaded Cores

Figure 3:
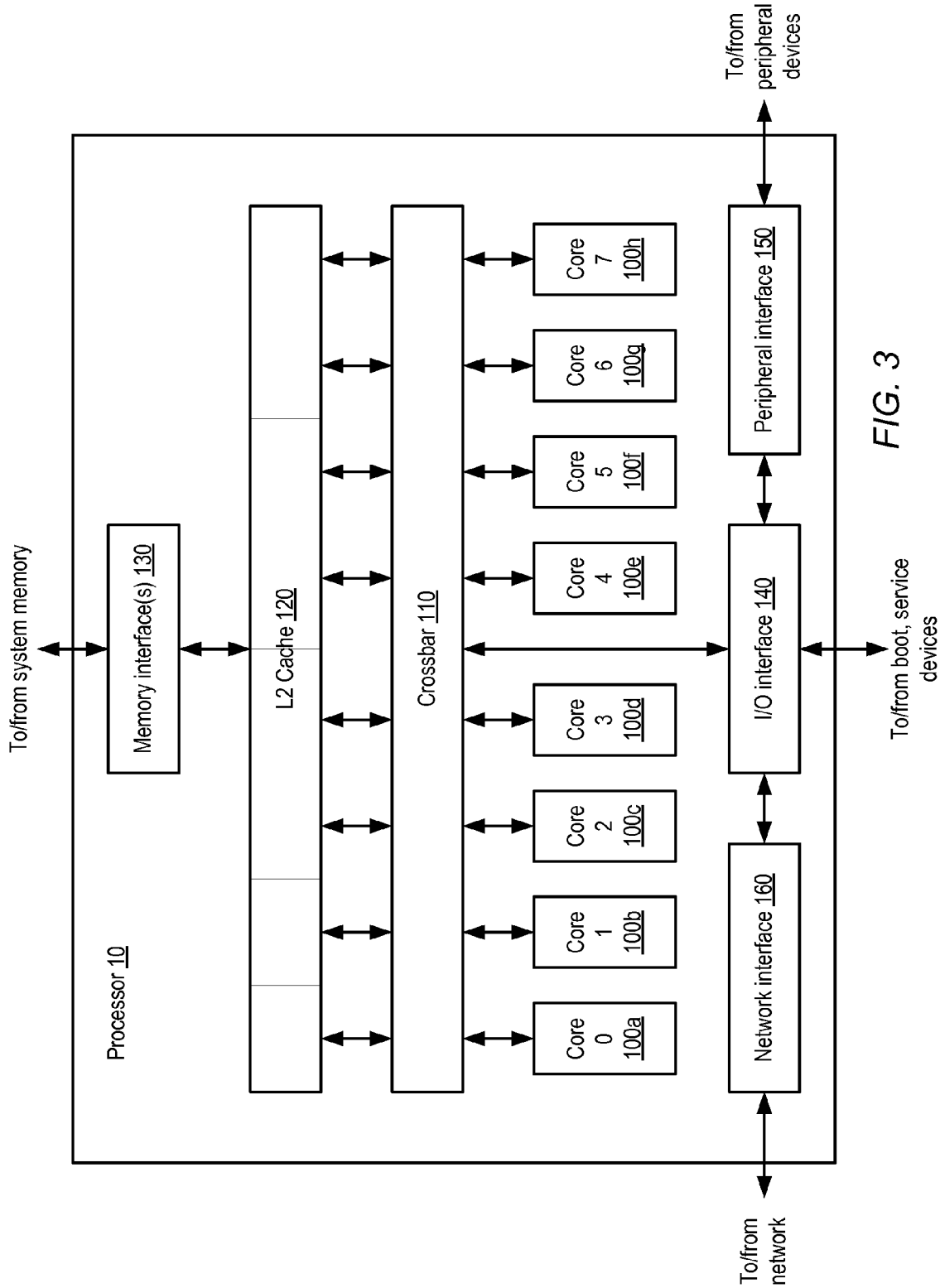
FIG. 3 is a block diagram illustrating an embodiment of a multithreaded processor.

In various embodiments, a multicore processor may include a number of instances of core 100, as well as other features. One example of an 8-core processor is shown in FIG. 3. In the illustrated embodiment, processor 10 includes eight instances of core 100 denoted cores 100a-h and also designated "core 0" though "core 7." Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Figure 4:
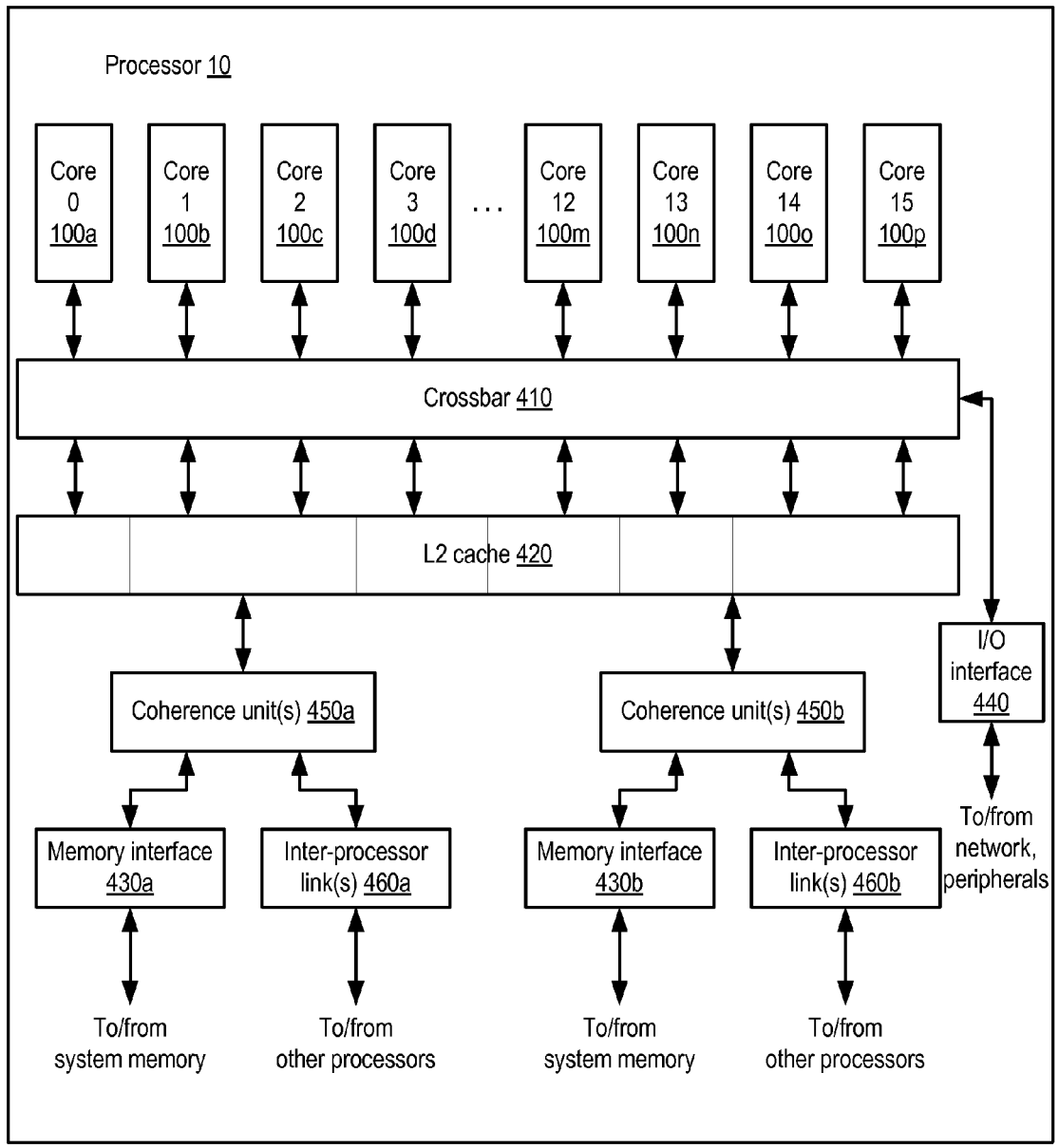
FIG. 4 is a block diagram illustrating another embodiment of a multithreaded processor.

Other possible configurations of processor 10 may include more or fewer processor cores than the version shown in FIG. 3, and may also include other or different features. FIG. 4 illustrates one such alternative embodiment. In the embodiment shown in FIG. 4, processor 10 includes 16 instances of cores 100 denoted cores 100*a-p* as well as "core 0" through "core 15," although for clarity, not all instances are shown in FIG. 4. Cores 100 are coupled to an L2 cache 420 as well as an I/O interface 440 through a crossbar 410. L2 cache 420 is coupled to coherence units 450*a-b*, which are in turn respectively coupled to memory interfaces 430*a-b* and inter-processor links 460*a-b*. It is noted that in various embodiments, the organization of FIG. 4 may represent a logical organization rather than a physical organization, and other components may also be employed. For example, in some embodiments, cores 100 and banks of L2 cache 420 may not connect directly to crossbar 410, but may instead interface with the crossbar through intermediate logic.

Like crossbar 110 discussed above, crossbar 410 may be configured to manage data flow between cores 100 and the shared L2 cache 420. In various embodiments, crossbar 410 may be implemented using any of the features or characteristics noted above with respect to crossbar 110. In particular, crossbar 410 may be configured to facilitate the exchange of data between any core 100 and any bank of L2 cache 420. It is noted that in various embodiments, crossbars 110 and 410 may be implemented using any suitable type of interconnect network, which may or may not correspond to a physical crossbar interconnect.

L2 cache 420 may be configured to cache instructions and data for use by cores 100, in a manner similar to L2 cache 120 discussed above. As the number of cores 100 is increased, the size of L2 cache 420 may also be increased in order to accommodate the additional cores 100. For example, in an embodiment including 16 cores 100, L2 cache 420 may be configured as a 6 MB cache including 16 individual cache banks of 384 KB, where each bank may be 24-way set associative with 256 sets and a 64-byte line size, although any other suitable cache size or geometry may also be employed.

As with L2 cache 110, in some embodiments, L2 cache 420 may include various queues and buffers configured to manage the flow of data to and from crossbar 410 as well as to and from coherence units 450*a-b*. For example, L2 cache 420 may implement a fill buffer, writeback buffer, and/or miss buffer such as described above with respect to L2 cache 110. In some embodiments, multiple banks of L2 cache 420 may share single instances of certain data structures or other features. For example, a single instance of a fill buffer may be shared by multiple banks of L2 cache 420 in order to simplify the physical implementation (e.g., routing and floorplanning) of L2 cache 420. Despite this sharing, individual banks of L2 cache 420 may be configured to concurrently and independently process accesses to data stored within the banks when such concurrency is possible.

I/O interface 440 may be configured to present cores 100 and/or L2 cache 420 with access to data from a source other than system memory Like I/O interface 140 (discussed above), I/O interface 440 may be configured to coordinate access to a network and/or peripheral interface, boot devices, or other suitable devices. Though not shown in FIG. 4, processor 10 may include network and peripheral interfaces similar to those shown in FIG. 3 and discussed above.

In some embodiments, processor 10 may be configured for use in multiprocessor systems in which multiple instances of processor 10 may share a common physical memory address space. For example, a multiprocessor system might include two, four, or some other number of processors 10. Each instance of processor 10 might be coupled to its own system memory (e.g., via memory interfaces 430*a-b*, as discussed below). However, each processor 10 may also be configured to access system memory that is coupled to a remote processor 10 other than itself.

Typically, in systems where more than one processor is capable of accessing the same memory address space, some type of coherence protocol may be used to ensure that the different processors present consistent memory behavior to executing software. For example, if two different processors attempted to write to the same memory address without some type of coordination, the same sequence of executing instructions that depends on data stored at that memory address might give different results on different occasions, depending upon which processor happened to be the first to write the data. A coherence protocol may require processors to coordinate with one another prior to acting on data (e.g., reading or writing to memory addresses) in order to prevent inconsistent execution behavior.

For example, a coherence protocol may define a set of states that characterize the coherence status of a unit of memory, such as a cache line. Such states may reflect the status of a unit of memory (e.g., a memory word, cache line, or coherence block) with respect to a particular processor. For example, according to the MESI coherence protocol, the coherence states may indicate to a given processor that the memory unit has been modified (M) by the given processor, is unmodified but exclusively resident (E) in the cache of the given processor, is unmodified and shared (S) by the given processor and at least one other processor (i.e., resident in multiple processors' caches), or is invalid (I) with respect to the given processor. Additionally, the coherence protocol may specify particular events that cause transitions among the various coherence states. For example, a version of the MESI protocol may require that before a processor can modify a unit of memory, it must first obtain exclusive access to that unit, which may be accomplished by invalidating any copies of that unit held by other processors. (It is noted that the MESI protocol is merely one example of a coherence protocol, and that other protocols involving additional or different states as well as state transitions are possible and contemplated.)

In various embodiments, coherence units 450a-b may be configured to implement and enforce a particular coherence protocol in order to coordinate memory accesses among multiple processors 10. For example, coherence units 450a-b may be configured to receive read or write requests that originate from L2 cache 420 (e.g., in response to cache misses), and to maintain data structures indicative of the coherence status of units of memory. In various embodiments, such data structures may include arrays of status bits that indicate the coherence status of various memory units with respect to the local processor 10, coherence directories that indicate coherence information with respect to all processors 10 within the system, or other suitable data structures. Any suitable granularity may be chosen for the unit of memory. For example, coherence units 450 may track coherence on the basis of the cache line size as defined by L2 cache 420, or may define a coherence block of some other size.

In some embodiments, individual ones of coherence units 450 may be dedicated to processing requests received from specific corresponding banks of L2 cache 420. For example, coherence units 450a-b might be configured to process even and odd banks of L2 cache 420, respectively, although any other suitable mapping of banks to coherence units may be employed, and other numbers of coherence units may be implemented. In other embodiments, any coherence unit 450 may be configured to process a request from any bank of L2 cache 420.

When coherence units 450a-b receive read or write requests, they may be configured to consult stored coherence state information and to coordinate transactions that may be necessary to complete the request. For example, depending on the coherence protocol employed, it may be necessary to invalidate another processor's copy of data before locally modifying it, or to obtain the most current copy of data from another processor if a local copy is invalid. Correspondingly, coherence units 450 may communicate with local system memory via memory interfaces 430a-b, as well as remote processors via inter-processor links 460a-b, in order to carry out transactions that accomplish data transfers and/or coherence state changes among these various entities.

Like memory interface 130 discussed above, memory interfaces 430a-b may be configured to manage the transfer of data between L2 cache 420 and system memory, via coherence units 450. Inter-processor links 460a-b may be configured to provide direct communication between instances of processor 10, e.g., for the exchange of memory data, I/O data, coherence control information, or other inter-processor communication. For example, these links may be implemented as high-speed serial point-to-point interconnects, such that each processor 10 may have one or more direct communication paths to the other processors 10. Alternative interconnect topologies such as shared buses, rings, cubes, etc. may also be employed.

Managing Invalidation Information in Multicore Processors

As noted above, various embodiments of processor 10 may include multiple levels of caches. For example, individual cores 100 may include first-level instruction and/or data caches, and may share access to a common L2 cache 120 or L2 cache 420 as discussed above with respect to FIGS. 3 and 4. In other embodiments, additional levels of caching may be employed. When multiple levels of caches are present, some sort of policy is often employed to control the relationship of the different levels with respect to copies of the same cache data. For example, a strictly inclusive cache policy may require that if data is present and valid within a higher-level cache, it must also be present and valid in a lower-level cache. Such a policy may help simplify coherence protocol implementation, because it may be necessary only to check the lower-level cache for the presence of data. That is, if the policy is enforced, there may be no possibility that data may be absent from the lower-level cache yet present in the higher-level cache, and thus no need to check the higher-level caches.

Figure 5:
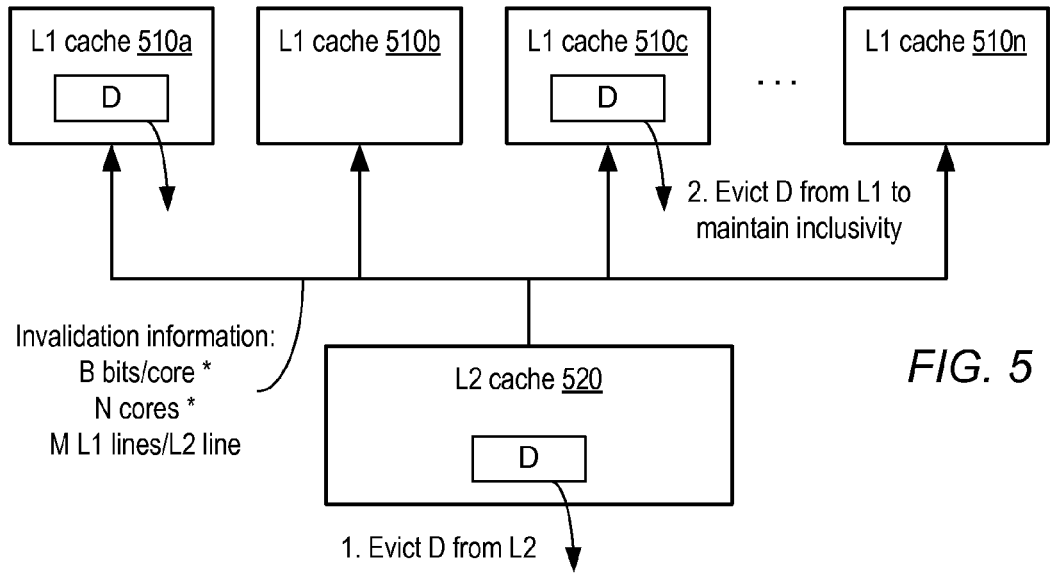
FIG. 5 is a block diagram illustrating an embodiment of a cache hierarchy.

To maintain the property of inclusivity, when data is evicted or otherwise invalidated from a lower-level cache, it may be necessary to ensure that any copy of that data that resides in a higher-level cache is invalidated. An example of this scenario is shown in FIG. 5, which shows an L2 cache 520 along with a number of L1 caches 510a-n. For example, L2 cache 520 may correspond to L2 cache 120 or L2 cache 420, or to a differently configured L2 cache. L1 caches 510 may correspond to instruction and/or data caches such as those that may be included within cores 100 (e.g., instruction cache 204 and/or data cache 235, as discussed above). In the example of FIG. 5, data D resides both in L2 cache 520 as well as L1 caches 510a and 510c. D may be evicted from L2 cache 520, for example, because of an L2 cache fill operation that requires that old data be removed to make room for fill data, or because a remote processor 10 has requested exclusive access to D.

Once it has been determined that D will be evicted from L2 cache 520, those copies of D that are resident in L1 caches 510 may also be evicted. It is noted that in general, "eviction" may refer to any event that causes data to become invalidated within a cache. If a cache is implemented as a writeback cache and the evicted data has been modified, eviction may also include writing the evicted data to a lower level of the memory hierarchy.

For L1 caches 510 to be able to invalidate D, it may be necessary to identify the location of D with sufficient specificity to distinguish D from other cache contents. However, it is noted that the location of data D may vary in different ones of L1 caches 510. For example, D may be present in an instruction cache of one core 100 and in a data cache of a different core 100. In some instances, D may be present in different ways of different L1 caches 510 (e.g., for a given set, D may be present in way 0 of one cache and way 2 of another). Correspondingly, the data needed to adequately identify D for eviction may vary for different L1 caches 510, and by extension, for different ones of cores 100.

In some embodiments, to ensure that D is evicted from L1 caches 510, L2 cache 520 may be configured to convey an invalidation packet to L1 caches 510. As described in greater detail below, the invalidation packet may include data such as the set index of the L1 cache line to be evicted, the cache way occupied by the line to be evicted, and an indication of which L1 cache the eviction applies to. Moreover, as noted above, at least some of this information may be different for different cores 100. In some embodiments, L2 cache 520 may be configured to maintain a cache directory data structure that indicates, for each core 100, where an L2 cache line is stored within L1 caches 510 (if at all). The cache directory may be updated as data enters L1 caches 510 (e.g., via fill requests processed by L2 cache 520) and as data leaves L1 caches 510 (e.g., in response to evictions generated within cores 100).

The amount of invalidation information that may need to be conveyed from L2 cache 520 to L1 caches 510 may depend on several factors, some of which are shown in FIG. 5. For example, the total amount of invalidation information may be determined by the product of the number of bits (B) of invalidation information needed per core 100 and the number of cores 100 (N) implemented by processor 10 (i.e., B*N). The number of bits B may generally depend on the cache organization of cores 100. For example, a greater number of L1 cache ways implemented within a core 100 may require a larger number of bits per core to distinguish among the cache ways.

Additionally, one L2 cache line may correspond to multiple L1 cache lines, such that one L2 cache line eviction may result in multiple L1 cache line evictions. Thus, the product B*N may be further multiplied by the number of L1 cache lines that correspond to an L2 cache line (M). For example, an embodiment using 4 bits of invalidation information for each of 8 cores and having 4 L1 cache lines per L2 cache line may generate a total of 4*8*4=128 bits of eviction information to be communicated from L2 cache 520 to L1 caches 510.

From the foregoing, it can be seen that as the number of cores 100 increases, the amount of invalidation information to be transmitted from L2 cache 520 to L1 caches 510 in the event of an L2 eviction may correspondingly increase. For example, in order to scale an 8-core implementation of processor 10 to a total of 16 cores, it may be necessary to transmit a total of 256 bits of invalidation information from L2 cache 520 to L1 caches 510.

Figure 6:
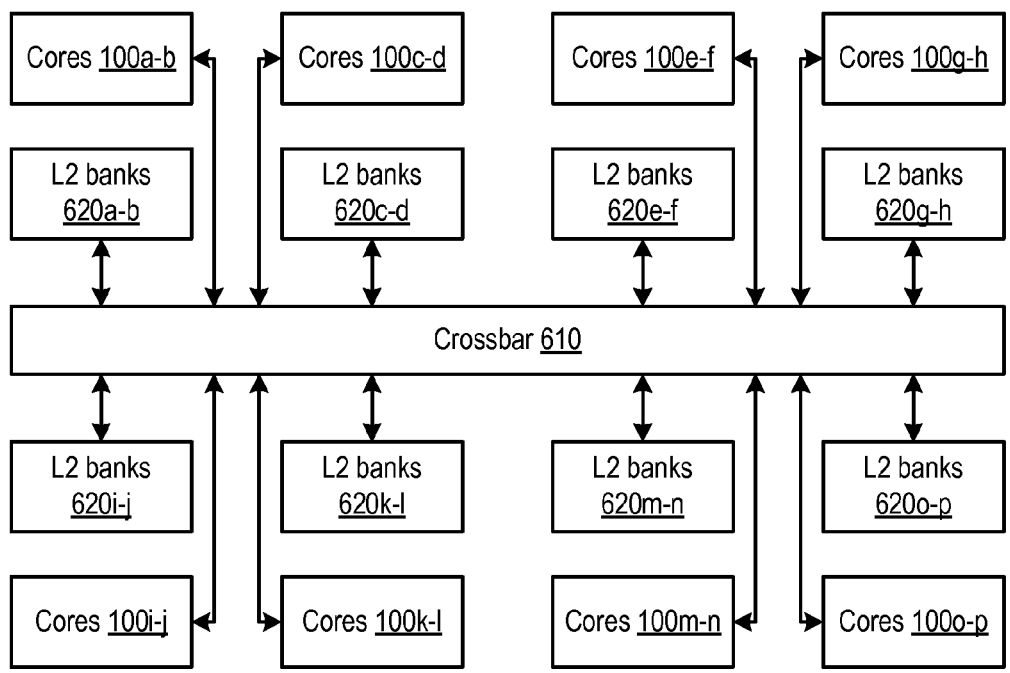
FIG. 6 is a block diagram illustrating an example of a physical arrangement of processor cores and cache banks.

However, implementing a bus of this size may be costly. For example, FIG. 6 illustrates an example of a floorplan showing how cores and L2 cache banks might be physically arranged on a die. In the illustrated embodiment, a crossbar 610 is shown interconnecting 16 cores 100a-p and 16 L2 cache banks 620a-p. For example, crossbar 610 may be an instance of crossbar 110 or crossbar 410 that, as discussed above, may be configured to allow any of cores 100 to access any of L2 cache banks 620. Similarly, L2 cache banks 620a-p may be elements of L2 cache 120 or L2 cache 420. Crossbar 610 may also be referred to as an interconnect network, and may be implemented using any suitable connectivity topology. That is, crossbar 610 may but need not be implemented as a full crossbar configured to route any of N inputs to any of M outputs.

As shown, cores L2 cache banks 620 and cores 100 are arranged peripherally around crossbar 610. In some embodiments, crossbar 610 may be configured to implement queues or other data structures in order to facilitate data transfer between cores 100 and L2 banks 620, and vice versa. Crossbar 610 may also be configured to maintain ordering of memory operations such as store operations, for example by assigning timestamps to memory operations. A significant increase in the amount of invalidation information needed to be transmitted between the cache and cores (such as the doubling from 128 to 256 bits in the example just given) may substantially increase the amount of area needed to implement the queues and to route crossbar 610, which may in turn increase the overall size and power consumption of processor 10.

In some embodiments, the implementation cost of routing a large amount of invalidation information to a large number of cores 100 may be ameliorated. To understand one technique for reducing invalidation information cost, the scenario involving multiple L1 cache line evictions per L2 cache line eviction is first considered. As noted above, in embodiments where the L2 cache line size is larger than the L1 cache line size, eviction of a single L2 cache line may result in eviction of multiple distinct L1 cache lines. This may require multiple distinct requests to evict the L1 cache lines, along with associated invalidation information. For example, the L1 cache may not support a mode in which a single eviction request is capable of evicting multiple L1 lines, necessitating distinct eviction requests. Separately, it is possible that the multiple distinct L1 cache lines have different location information (e.g., different lines may reside in different ways of the L1 cache), such that different invalidation information is needed for the different L1 cache lines.

Thus, in some embodiments, it may be difficult to avoid specifying distinct invalidation information for each L1 cache line eviction. However, it is noted that it may not be necessary to perform each L1 cache line eviction concurrently in response to the L2 cache line eviction. As discussed in greater detail below, if instead the L1 cache lines are invalidated sequentially, the amount of invalidation information to be transferred per invalidation (and thus the corresponding wire burden) may be substantially reduced.

FIG. 7 illustrates an embodiment of an L2 cache line as well as an embodiment of an invalidation packet that may be used to invalidate cache lines within cores 100. For the purposes of explanation, L2 cache line 622 is shown as encompassing 4 L1 cache lines designated 0-3, although in other embodiments, L2 cache line 622 may include any other number of L1 cache lines.

Additionally, invalidation packet 700 may be specifically adapted for the invalidation of a single L1 cache line within cores 100. In the illustrated embodiment, invalidation packet 700 may include address information that is pertinent to the cache line being invalidated and that may be generic to all cores 100 (e.g., information identifying the index of the cache line). Invalidation packet 700 may also include invalidation information that is specific to each of cores 100. Like the invalidation information shown in FIG. 5, the information in FIG. 7 may include B bits for each of N cores. However, because invalidation packet 700 is specific to an individual L1 cache line, it may include 1/M of the bits of the invalidation information shown in FIG. 5. Thus, in the case where there are four L1 cache lines per L2 cache line as shown in FIG. 7 (i.e., M=4), then the invalidation information portion of invalidation packet 700 may include ¼ of the bits of the information shown in FIG. 5 (e.g., 64 bits vs. 256 bits in the case where B=4 and N=16).

FIG. 8 illustrates an embodiment of a method of operation of a processor using an invalidation packet that is adapted for the invalidation of individual higher-level cache lines in response to the invalidation of a lower-level cache line. Operation of the method begins in block 800 where an invalidation event is detected with respect to a lower-level cache. Generally speaking, an invalidation event may correspond to any event that causes data to be invalidated, and may encompass an eviction caused by a cache fill, an invalidation caused by operation of a coherence protocol, or any other suitable type of event. In some embodiments, the lower-level cache and upper-level cache may correspond to L2 and L1 caches, respectively. However, the use of L1 and L2 caches as examples herein is meant only to simplify exposition. It is contemplated that in other embodiments, the lower-level and higher-level caches may occupy other levels of a memory hierarchy, and the techniques described herein may apply equally to such embodiments.

Invalidation information for one or more of the lines of the higher-level cache that correspond to the invalidated line of the lower-level cache is then generated (block 802). For example, an L2 cache may consult coherence directory information to determine, for each of several cores 100, which L1 caches contain valid lines that correspond to an evicted L2 cache line.

A sequence of invalidation packets corresponding to the higher-level cache lines to be invalidated is then conveyed to the higher-level caches (block 804). For example, FIG. 9 illustrates a sequence of invalidation packets 700a-d that may be conveyed from L2 cache banks 620 to cores 100 via crossbar 610, arranged according to the time of their conveyance to cores 100. Packets 700a-d may correspond respectively to L1 cache lines 0-3 (or any other suitable ordering) shown in FIG. 7. For example, packet 700a may include address and invalidation information sufficient to allow cores 100 to invalidate L1 cache line 0 within their L1 caches. In some embodiments, invalidation information for all higher-level cache lines may be generated before any invalidation packets are sent, while in other embodiments, the generation of invalidation information (e.g., by retrieving coherence directory information) may be sequentially interleaved with the sending of invalidation packets.

Upon receipt of the invalidation packet, the higher-level caches may invalidate the indicated cache line according to the invalidation information (block 806). For example, cores 100 may direct their L1 data and/or instruction caches to invalidate the indicated cache line according to the index and way information indicated in the validation packet.

It is noted that as shown in FIG. 9, at any given time, the individual invalidation packets may contain less invalidation information than shown in FIG. 5. Accordingly, the individual invalidation packets may be conveyed over an interface (e.g., a bus) that is narrower than would be needed to concurrently convey all the invalidation information for all higher-level cache lines corresponding to an invalidated lower-level cache line. For example, as shown in FIG. 9, the bus width corresponding to the invalidation information portion of the invalidation packet may need to accommodate only B*N bits, rather than the B*N*M bits of FIG. 5.

A sequence of invalidation packets may require more time to complete the invalidation of the higher-level caches than if the invalidation information were sent concurrently. However, invalidations may typically occur infrequently, and processor performance may be relatively insensitive to the latency with which an invalidation is completed (in contrast to, e.g., the cache hit latency, which on average occurs much more frequently than invalidation). Thus, the additional latency needed to complete higher-level cache invalidation using a sequence of invalidation packets may be outweighed by the savings in implementation cost (e.g., area and power) afforded by using a narrower data path for invalidation information.

Figure 10:
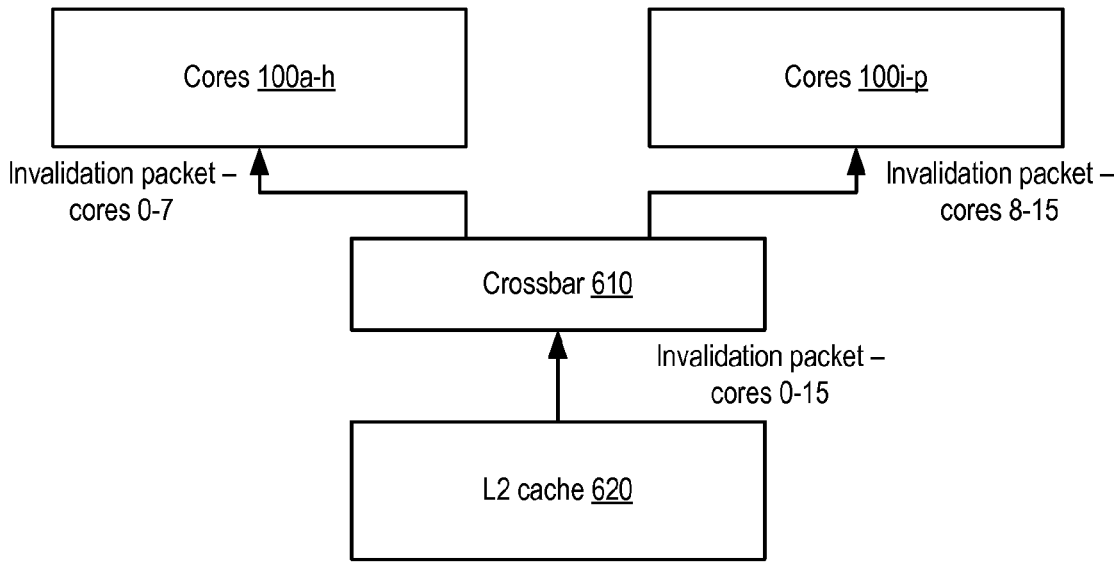
FIG. 10 is a block diagram illustrating an embodiment of invalidation packet splitting.

The embodiment of FIG. 10 illustrates another technique that may be applied to reduce the implementation cost of conveying large amounts of invalidation information to a large number of processor cores. In the illustrated embodiment, L2 cache 620 is shown coupled to crossbar 610, which is in turn coupled to 16 cores 100a-p. (In other embodiments, any other number of cores 100 may be employed.) Generally speaking, L2 cache 620 and crossbar 610 may correspond to any of the L2 cache and crossbar embodiments previously discussed, or suitable variations thereof. (It is noted that the arrangement of FIG. 10 may depict a logical arrangement of components rather than a physical arrangement. For example, in a physical implementation, cores 100 and banks of L2 cache 620 may be physically distributed around a centrally-placed crossbar 610, such as in the embodiment shown in FIG. 6.)

As shown, L2 cache 620 may be configured to generate an invalidation packet that includes invalidation information pertinent to all of cores 100a-p. For example, when an L2 cache line is invalidated, L2 cache 620 may be configured to consult its coherence directories or other data structures to determine which of cores 100 have L1 cache lines that should also be invalidated. The result may be a set of invalidation information that indicates, for each of cores 100a-p, whether a particular core 100 should invalidate an L1 cache line, and where that line is located within the L1 cache in the particular core 100. In some embodiments, L2 cache 620 may generate a single invalidation packet that corresponds to all or multiple ones of the L1 cache lines to be invalidated, while in other embodiments, L2 cache 620 may generate one invalidation packet for each L1 cache line to be invalidated (e.g., as discussed above with respect to FIGS. 7-9).

Although L2 cache 620 may need to consider the status of each core 100 when determining what L1 cache lines should be invalidated, it may be unnecessary for each core 100 to receive invalidation information for a core other than itself. For example, a particular core 100a may be configured to decode invalidation information that is identified as pertaining to core 100a (e.g., by virtue of its encoding, as discussed below) and to ignore invalidation information that pertains to any other core 100.

Correspondingly, in some embodiments, crossbar 610 may be configured to split the invalidation information received from L2 cache 620 into portions, where each portion corresponds to a respective group of fewer than all of cores 100. For each of the portions of invalidation information, crossbar 610 may then convey a separate invalidation packet including that portion of invalidation information to its corresponding group of cores 100, such that the portion of invalidation information is not sent to cores 100 outside the corresponding group of cores 100.

For example, FIG. 10 illustrates an embodiment in which crossbar 610 is configured to receive invalidation information from L2 cache 620 that corresponds to 16 cores 100, denoted cores 0-15. Crossbar 610 may be further configured to split this invalidation information into two portions, one of which corresponds to cores 0-7, and the other one of which corresponds to cores 8-15. Crossbar 610 may then send two distinct invalidation packets. The packet sent to cores 0-7 may include the invalidation information pertinent to cores 0-7 and may exclude the invalidation information pertinent to cores 8-15, while the packet sent to cores 8-15 may include information for cores 8-15 and exclude information that applies to cores 0-7.

In some embodiments, crossbar 610 may additionally be configured to assign the same timestamp to each of the invalidation packets it generates from splitting the invalidation packet received from L2 cache 620. By doing so, crossbar 610 may enable cores 100 to maintain the ordering of memory operations even if the packets sent by crossbar 610 to different groups of cores 100 are not received at exactly the same time. For example, cores 100 may be configured to process memory operations such as invalidations in timestamp order rather than order of receipt. In embodiments that implement Total Store Ordering (TSO), timestamps may be used to ensure that memory operations conform to the TSO memory model. In other embodiments, a relaxed memory ordering model may be employed, and timestamps may support implementation of the relaxed memory model, or may possibly be omitted.

By splitting the invalidation information received from L2 cache 620 into portions in this manner, the amount of invalidation information that may need to be routed to any given core 100 may be reduced. For example, if cores 100 are organized into two groups as shown in FIG. 10, each core 100 may receive only one half of the invalidation information that it would otherwise receive if splitting were not implemented. This may in turn reduce the size of the buses needed to route the invalidation information from crossbar 610 to cores 100, which may reduce wire congestion and simplify the physical implementation of processor 10. For example, in an embodiment including 16 cores and 4 bits of invalidation information per core, by splitting invalidation information into two portions, it may be necessary to route only 32 bits of invalidation information to any given core rather than 64 bits.

It is noted that the two portions illustrated in FIG. 10 are merely an example. In other embodiments, invalidation information may be split into a greater number of portions, each of which may correspond to a group that includes a smaller number of cores 100. For example, invalidation information may be split into four portions, each corresponding to four of cores 100, or any other suitable configuration.

Figure 11:
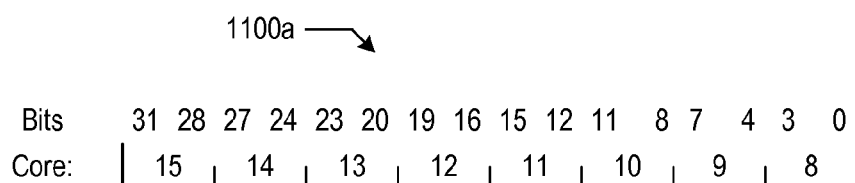
FIG. 11 illustrates an example format of invalidation information.
Figure 11:
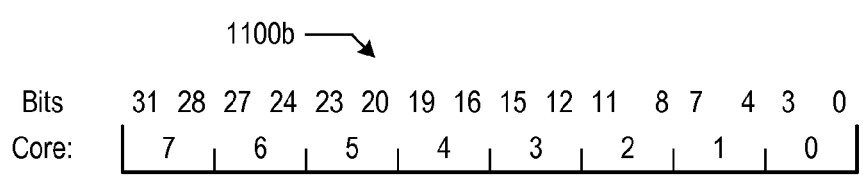

FIG. 11 illustrates an example of how invalidation information may be formatted after it has been split into two portions by crossbar 610. In the illustrated embodiment, invalidation information 1100a may correspond to information that may be included in an invalidation packet sent to cores 8-15 of FIG. 10, while invalidation information 1100b may correspond to information that may be included in an invalidation packet sent to cores 0-7. As shown, each set of invalidation information 1100 includes a four-bit field of invalidation information for each of eight cores, where the correspondence of a given field to a given core is signified by the position of the given field within the invalidation information. In other embodiments, the correspondence of field position to core may differ from the illustrated correspondence, and in some embodiments, the correspondence may be explicitly encoded (e.g., by explicitly associating a core identified with a field of invalidation information) rather than implicitly dependent upon position.

In the illustrated embodiment, the four-bit encoding scheme may differentiate between cases where no invalidation is required and cases where invalidation is required in either an instruction cache or a data cache. For example, assume the bits of the four-bit field are denoted 3 (most significant) to 0 (least significant). As shown, if bits 1:0 are "00," this may signify that no invalidation is required. If bits 1:0 are "10," this may signify that the line to be invalidated is located in the data cache way identified by bits 3:2 (e.g., assuming a 4-way set associative data cache). If bit 0 is "1," this may signify that the line to be invalidated is located in the instruction cache way identified by bits 3:1 (e.g., assuming an 8-way set associative data cache). However, numerous other encodings are possible and contemplated. For example, different encoding schemes and/or additional bits may be employed for L1 caches having different degrees of set associativity than those shown in FIG. 11.

The various techniques and examples discussed above represent only possible embodiments, with other possible embodiments also contemplated. For example, in various embodiments, either of the techniques of sequential invalidation packets (e.g., as discussed with respect to FIGS. 7-9) or split invalidation packets (e.g., as discussed with respect to FIGS. 10-11) may be employed without the other, or both may be employed together.

Moreover, while invalidation has been discussed above in the context of eviction of a data line from a cache that implements strict inclusivity, invalidation may occur for other reasons and in other types of caches. For example, invalidation may occur in response to the memory coherence activity of peripheral devices or other processors, or in response to software activity such as execution of an instruction that causes invalidation of all or part of a cache. It is noted that the techniques discussed above with respect to invalidation information may apply regardless of the context or reason for which an invalidation occurs, and regardless of whether or not a policy of strict inclusivity is applied with respect to the caches.

Also, although the discussion above refers to L1 and L2 caches, in other embodiments, the techniques described herein may apply to any combination of higher-level and lower-level caches within a memory hierarchy. Generally speaking, "higher level" may refer to a level of a memory hierarchy that is closer to a data processing unit (e.g., an instruction fetch unit or an execution unit) than is a "lower level" of the hierarchy. Put another way, higher levels of a memory hierarchy may tend to be architecturally closer to a processor, while lower levels of a memory hierarchy may tend to be architecturally closer to system memory or mass storage devices. Thus, for example, the techniques described herein may also be applied in an embodiment where an L2 cache is the higher-level cache and an L3 cache is the lower-level cache.

Example System Embodiment

Figure 12:
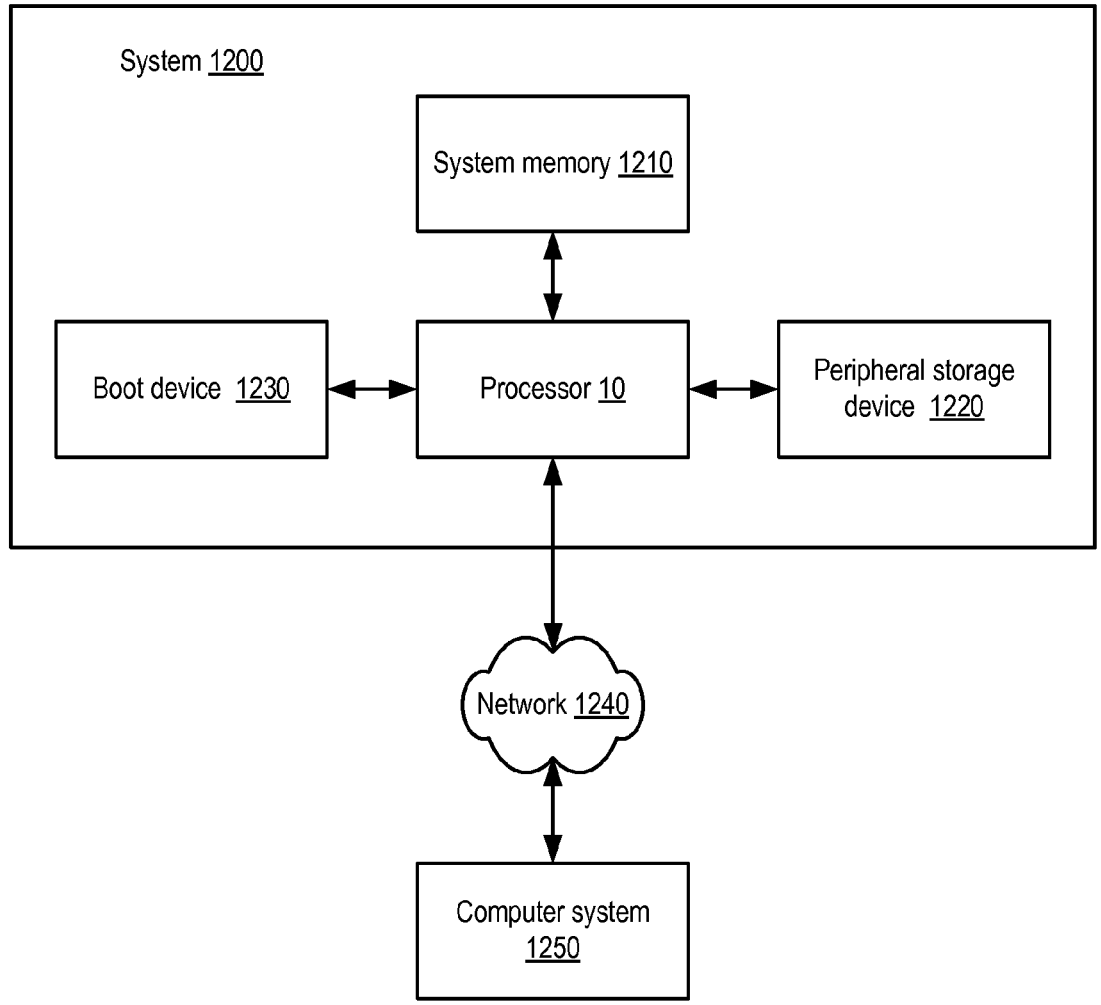
FIG. 12 is a block diagram illustrating an embodiment of a system including a multithreaded processor.

As described above, in some embodiments processor 10 as shown in FIG. 3 or 4 may be configured to interface with a number of external devices. An embodiment of a system including processor 10 is illustrated in FIG. 12. In the illustrated embodiment, system 1200 includes an instance of processor 10 coupled to a system memory 1210, a peripheral storage device 1220 and a boot device 1230. System 1200 is coupled to a network 1240, which is in turn coupled to another computer system 1250. In some embodiments, system 1200 may include more than one instance of the devices shown, such as more than one processor 10, for example. In various embodiments, system 1200 may be configured as a rack-mountable server system, a standalone system, or in any other suitable form factor. In some embodiments, system 1200 may be configured as a client system rather than a server system.

In various embodiments, system memory 1210 may comprise any suitable type of system memory as described above, such as FB-DIMM, DDR/DDR2 SDRAM, or RDRAM®, for example. System memory 1210 may include multiple discrete banks of memory controlled by discrete memory interfaces in embodiments of processor 10 configured to provide multiple memory interfaces 130. Also, in some embodiments system memory 1210 may include multiple different types of memory.

Peripheral storage device 1220, in various embodiments, may include support for magnetic, optical, or solid-state storage media such as hard drives, optical disks, nonvolatile RAM devices, etc. In some embodiments, peripheral storage device 1220 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 1230 may include a device such as an FPGA or ASIC configured to coordinate initialization and boot of processor 10, such as from a power-on reset state. Additionally, in some embodiments boot device 1230 may include a secondary computer system configured to allow access to administrative functions such as debug or test modes of processor 10.

Network 1240 may include any suitable devices, media and/or protocol for interconnecting computer systems, such as wired or wireless Ethernet, for example. In various embodiments, network 1240 may include local area networks (LANs), wide area networks (WANs), telecommunication networks, or other suitable types of networks. In some embodiments, computer system 1250 may be similar to or identical in configuration to illustrated system 1200, whereas in other embodiments, computer system 1250 may be substantially differently configured. For example, computer system 1250 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
    a plurality of hardware processor cores, each comprising a respective higher-level cache, wherein each higher-level cache comprises a plurality of higher-level cache lines; and
    a hardware lower-level cache comprising a plurality of lower-level cache lines, wherein each of the lower-level cache lines is configured to store data that corresponds to multiple higher-level cache lines;
    wherein in response to invalidating a given one of the lower-level cache lines, the lower-level cache is configured to convey a sequence of invalidation packets to the plurality of processor cores via an interface, wherein each member of the sequence of invalidation packets corresponds to a respective higher-level cache line to be invalidated, and wherein the sequence of invalidation packets comprises a total of N bits, and wherein the interface has a bit-width of less than N bits; and
    wherein each of the invalidation packets comprises invalidation information indicative of a location of the respective higher-level cache line within different ones of the processor cores.

2. The processor as recited in claim 1, further comprising an interconnect network coupled to exchange information between individual ones of the processor cores and the lower-level cache, wherein the interconnect network is configured to:
    receive a given invalidation packet from the lower-level cache;
    split the invalidation information included within the given invalidation packet into a plurality of portions, wherein each of the portions corresponds to a respective group that includes fewer than all of the processor cores;
    for each given one of the portions, convey a distinct invalidation packet including the given portion to processor cores that are members of the respective group corresponding to the given portion, without conveying the distinct invalidation packet to processor cores that are not members of the respective group corresponding to the given portion.

3. The processor as recited in claim 2, wherein the processor cores are physically distributed around at least two opposite sides of the interconnect network.

4. The processor as recited in claim 3, wherein the lower-level cache comprises a plurality of banks, and wherein the banks are also physically distributed around the at least two opposite sides of the interconnect network.

5. The processor as recited in claim 1, wherein the lower-level cache is configured as a second-level (L2) cache, and wherein the higher-level caches are configured as first-level (L1) caches.

6. The processor as recited in claim 1, wherein for a particular processor core, the respective higher-level cache is configured as a set-associative cache comprising multiple ways, and wherein the invalidation information included in the invalidation packet is configured to indicate which one of the ways stores the higher-level cache line to be invalidated within the particular processor core.

7. The processor as recited in claim 1, wherein each of the processor cores comprises multiple higher-level caches, and wherein the invalidation information included in the invalidation packet for a particular processor core is configured to indicate which one of the multiple higher-level caches stores the higher-level cache line to be invalidated within the particular processor core.

8. A method, comprising:
    a hardware lower-level cache detecting an invalidation of a given one of a plurality of lower-level cache lines of the lower-level cache;
    in response to detecting the invalidation of the given lower-level cache line, the lower-level cache conveying a sequence of invalidation packets to a plurality of hardware processor cores via an interface, wherein each of the processor cores comprises a respective higher-level cache, wherein each higher-level cache comprises a plurality of higher-level cache lines, and wherein each of the lower-level cache lines is configured to store data that corresponds to multiple higher-level cache lines;
    wherein each member of the sequence of invalidation packets corresponds to a respective higher-level cache line to be invalidated, and wherein the sequence of invalidation packets comprises a total of N bits, and wherein the interface has a bit-width of less than N bits; and
    wherein each of the invalidation packets comprises invalidation information indicative of a location of the respective higher-level cache line within different ones of the processor cores.

9. The method as recited in claim 8, further comprising:
    an interconnect network receiving a given invalidation packet from the lower-level cache;
    the interconnect network splitting the invalidation information included within the given invalidation packet into a plurality of portions, wherein each of the portions corresponds to a respective group that includes fewer than all of the processor cores; and
    for each given one of the portions, the interconnect network conveying a distinct invalidation packet including the given portion to processor cores that are members of the respective group corresponding to the given portion, without conveying the distinct invalidation packet to processor cores that are not members of the respective group corresponding to the given portion.

10. The method as recited in claim 9, wherein the processor cores are physically distributed around at least two opposite sides of the interconnect network.

11. The method as recited in claim 10, wherein the lower-level cache comprises a plurality of banks, and wherein the banks are also physically distributed around the at least two opposite sides of the interconnect network.

12. The method as recited in claim 8, wherein the lower-level cache is configured as a second-level (L2) cache, and wherein the higher-level caches are configured as first-level (L1) caches.

13. The method as recited in claim 8, wherein for a particular processor core, the respective higher-level cache is configured as a set-associative cache comprising multiple ways, and wherein the invalidation information included in the invalidation packet is configured to indicate which one of the ways stores the higher-level cache line to be invalidated within the particular processor core.

14. The method as recited in claim 8, wherein each of the processor cores comprises multiple higher-level caches, and wherein the invalidation information included in the invalidation packet for a particular processor core is configured to indicate which one of the multiple higher-level caches stores the higher-level cache line to be invalidated within the particular processor core.

15. A system, comprising:
a system memory; and
a processor coupled to the system memory, wherein the processor comprises:
a plurality of hardware processor cores, each comprising a respective higher-level cache, wherein each higher-level cache comprises a plurality of higher-level cache lines; and
a hardware lower-level cache comprising a plurality of lower-level cache lines, wherein each of the lower-level cache lines is configured to store data that corresponds to multiple higher-level cache lines;
wherein in response to invalidating a given one of the lower-level cache lines, the lower-level cache is configured to convey a sequence of invalidation packets to the plurality of processor cores via an interface, wherein each member of the sequence of invalidation packets corresponds to a respective higher-level cache line to be invalidated, and wherein the sequence of invalidation packets comprises a total of N bits, and wherein the interface has a bit-width of less than N bits; and
wherein each of the invalidation packets comprises invalidation information indicative of a location of the respective higher-level cache line within different ones of the processor cores.

16. The system as recited in claim 15, wherein the processor further comprises an interconnect network coupled to exchange information between individual ones of the processor cores and the lower-level cache, wherein the interconnect network is configured to:
receive a given invalidation packet from the lower-level cache;
split the invalidation information included within the given invalidation packet into a plurality of portions, wherein each of the portions corresponds to a respective group that includes fewer than all of the processor cores;
for each given one of the portions, convey a distinct invalidation packet including the given portion to processor cores that are members of the respective group corresponding to the given portion, without conveying the distinct invalidation packet to processor cores that are not members of the respective group corresponding to the given portion.

17. The system as recited in claim 16, wherein the processor cores are physically distributed around at least two opposite sides of the interconnect network.

18. The system as recited in claim 17, wherein the lower-level cache comprises a plurality of banks, and wherein the banks are also physically distributed around the at least two opposite sides of the interconnect network.

19. The system as recited in claim 15, wherein for a particular processor core, the respective higher-level cache is configured as a set-associative cache comprising multiple ways, and wherein the invalidation information included in the invalidation packet is configured to indicate which one of the ways stores the higher-level cache line to be invalidated within the particular processor core.

20. The system as recited in claim 15, wherein each of the processor cores comprises multiple higher-level caches, and wherein the invalidation information included in the invalidation packet for a particular processor core is configured to indicate which one of the multiple higher-level caches stores the higher-level cache line to be invalidated within the particular processor core.

* * * * *